United States Patent
Andriantsiferana et al.

(10) Patent No.: US 8,009,676 B2
(45) Date of Patent: Aug. 30, 2011

(54) DYNAMICALLY PROVIDING A QUALITY OF SERVICE FOR A MOBILE NODE

(75) Inventors: Laurent H. Andriantsiferana, Valbonne (FR); Jayaraman R. Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 11/190,704

(22) Filed: Jul. 26, 2005

(65) Prior Publication Data

US 2007/0025359 A1    Feb. 1, 2007

(51) Int. Cl.
*H04L 12/56* (2006.01)
(52) U.S. Cl. .................................. 370/395.21
(58) Field of Classification Search .................. 370/252, 370/254, 332, 395.21, 444; 455/452.2
See application file for complete search history.

(56) References Cited

U.S. PATENT DOCUMENTS

| | | | |
|---|---|---|---|
| 5,774,660 A | 6/1998 | Brendel et al. | 395/200.31 |
| 5,951,694 A | 9/1999 | Choquier et al. | 714/15 |
| 6,006,264 A | 12/1999 | Colby et al. | 709/226 |
| 6,016,305 A | 1/2000 | Borst et al. | 370/234 |
| 6,128,642 A | 10/2000 | Doraswamy et al. | 709/201 |
| 6,128,657 A | 10/2000 | Okanoya et al. | 709/224 |
| 6,137,777 A | 10/2000 | Vaid et al. | 370/230 |
| 6,185,619 B1 | 2/2001 | Joffe et al. | 709/229 |
| 6,201,962 B1 | 3/2001 | Sturniolo et al. | 455/432 |
| 6,249,801 B1 | 6/2001 | Zisapel et al. | 709/105 |
| 6,263,368 B1 | 7/2001 | Martin | 709/224 |
| 6,298,383 B1 | 10/2001 | Gutman et al. | 709/229 |
| 6,327,622 B1 | 12/2001 | Jindal et al. | 709/228 |
| 6,330,602 B1 | 12/2001 | Law et al. | 709/224 |
| 6,377,571 B1 | 4/2002 | Tai | 370/355 |
| 6,377,982 B1 | 4/2002 | Rai et al. | 709/217 |
| 6,393,458 B1 | 5/2002 | Gigliotti et al. | 709/203 |
| 6,393,482 B1 | 5/2002 | Rai et al. | 709/225 |
| 6,400,722 B1 | 6/2002 | Chuah et al. | 370/401 |
| 6,414,950 B1 | 7/2002 | Rai et al. | 370/338 |
| 6,421,714 B1 | 7/2002 | Rai et al. | 709/217 |
| 6,434,618 B1 | 8/2002 | Cohen et al. | 709/228 |
| 6,442,165 B1 | 8/2002 | Sitaraman et al. | 370/395.4 |
| 6,466,571 B1 | 10/2002 | Dynarski et al. | 370/352 |
| 6,473,802 B2 | 10/2002 | Masters | 709/229 |
| 6,484,143 B1 | 11/2002 | Swildens et al. | 705/1 |
| 6,512,754 B2 | 1/2003 | Feder et al. | 370/338 |

(Continued)

FOREIGN PATENT DOCUMENTS

FR          2 852 178 A1      9/2004

(Continued)

OTHER PUBLICATIONS

"A ubiquitous network resource control plane for end-to-end QoS", Technical White Paper, Copyright 2005 Operax AB, 7 pages, Feb. 2005.

(Continued)

*Primary Examiner* — Dang T Ton
*Assistant Examiner* — Kevin Lee
(74) *Attorney, Agent, or Firm* — Baker Botts L.L.P.

(57) ABSTRACT

Providing a quality of service for a mobile node includes facilitating a communication session for the mobile node. A quality of service decision factor of a context of the communication session is established. A quality of service associated with the quality of service decision factor is identified. Whether to provide the quality of service to the mobile node for the context is determined.

12 Claims, 2 Drawing Sheets

U.S. PATENT DOCUMENTS

| | | | |
|---|---|---|---|
| 6,529,501 B1 | 3/2003 | Zhao et al. ............... 370/353 | |
| 6,618,591 B1 | 9/2003 | Kalliokulju et al. | |
| 6,636,491 B1 | 10/2003 | Kari et al. | |
| 6,654,610 B1 | 11/2003 | Chen et al. | |
| 6,711,147 B1* | 3/2004 | Barnes et al. ............... 370/338 | |
| 6,847,610 B1 | 1/2005 | Suumäki et al. | |
| 7,599,323 B2* | 10/2009 | Chandranmenon et al. .. 370/328 | |
| 7,634,274 B2 | 12/2009 | Hurtta | |
| 2001/0048683 A1 | 12/2001 | Allan et al. | |
| 2002/0032800 A1* | 3/2002 | Puuskari et al. ............ 709/246 | |
| 2003/0060210 A1 | 3/2003 | Ravishankar et al. ........ 455/452 | |
| 2003/0108015 A1 | 6/2003 | Li | |
| 2003/0112782 A1 | 6/2003 | Mizell et al. | |
| 2003/0118038 A1 | 6/2003 | Jalava et al. | |
| 2003/0126435 A1 | 7/2003 | Mizell et al. | |
| 2003/0235174 A1 | 12/2003 | Pichna et al. | |
| 2004/0037269 A1 | 2/2004 | Lundin ............... 370/352 | |
| 2004/0038700 A1 | 2/2004 | Gibbs | |
| 2004/0109455 A1* | 6/2004 | Jouppi et al. ............ 370/395.52 | |
| 2004/0162105 A1 | 8/2004 | Reddy et al. | |
| 2004/0221051 A1 | 11/2004 | Liong et al. | |
| 2004/0248583 A1 | 12/2004 | Satt et al. | |
| 2004/0266394 A1 | 12/2004 | Mizell et al. | |
| 2005/0041584 A1 | 2/2005 | Lau et al. | |
| 2005/0044138 A1 | 2/2005 | Albert et al. | |
| 2005/0058068 A1* | 3/2005 | Ben Ali et al. ............... 370/230 | |
| 2005/0185583 A1* | 8/2005 | Hosein ............... 370/232 | |
| 2005/0210141 A1* | 9/2005 | Oyama et al. ............... 709/228 | |
| 2006/0020938 A1* | 1/2006 | Elcock et al. ............... 717/178 | |
| 2006/0173968 A1 | 8/2006 | Vaarala et al. | |
| 2007/0058561 A1* | 3/2007 | Virgile ............... 370/252 | |
| 2007/0124490 A1 | 5/2007 | Kalavade et al. | |
| 2008/0068995 A1* | 3/2008 | Skog ............... 370/230.1 | |
| 2008/0259865 A1 | 10/2008 | Hurtta et al. | |

FOREIGN PATENT DOCUMENTS

| | | | |
|---|---|---|---|
| WO | WO 2004/082224 A2 | 9/2004 | |
| WO | WO 2006/004471 A1 | 1/2006 | |

OTHER PUBLICATIONS

Hui-Lan Lu, Ph.D., "*Quality of Service Standardization for Next Generation Networks*", International Telecommunication Union, ITU-T NGN Technical Workshop, Jeju Island, Korea, 16 pages, Mar. 14-15, 2005.

"*Architectural Enhancements for End-to-End Quality of Service*", www.tkn.tu-berlin.de/curricula, 10 pages, Printed May 2005.

PCT Notification of Transmittal of the International Search Report and the Written Opinion of the International Searching Authority, or the Declaration with attached PCT International Search Report and Written Opinion of the International Searching Authority in International Application No. PCT/US2006/027951, dated Nov. 21, 2006, 13 pages, Nov. 21, 2006.

European Patent Office, Communication Pursuant to Article 94(3) EPC, Application No. 06 787 793.6-2412, 4 pages, Jul. 11, 2008.

USPTO, Office Action dated Jun. 29, 2007 for U.S. Appl. No. 10/715,815, filed Nov. 18, 2003 in the name of Jayaraman R. Iyer, 15 pages, Jun. 29, 2007.

USPTO, Final Office Action dated Dec. 14, 2007 for U.S. Appl. No. 10/715,815, filed Nov. 18, 2003 in the name of Jayaraman R. Iyer, 22 pages, Dec. 14, 2007.

USPTO, Advisory Action dated Jan. 24, 2008 for U.S. Appl. No. 10/715,815, filed Nov. 18, 2003 in the name of Jayaraman R. Iyer, 3 pages, Jan. 24, 2008.

USPTO, Office Action dated May 13, 2008 for U.S. Appl. No. 10/715,815, filed Nov. 18, 2003 in the name of Jayaraman R. Iyer, 23 pages, May 13, 2008.

USPTO, Final Office Action dated Nov. 10, 2008 for U.S. Appl. No. 10/715,815, filed Nov. 18, 2003 in the name of Jayaraman R. Iyer, 37 pages, Nov. 10, 2008.

USPTO, Interview Summary dated Jan. 16, 2009 for U.S. Appl. No. 10/715,815, filed Nov. 18, 2003 in the name of Jayaraman R. Iyer, 2 pages, Jan. 16, 2009.

USPTO, Advisory Action dated Jan. 26, 2009 for U.S. Appl. No. 10/715,815, filed Nov. 18, 2003 in the name of Jayaraman R. Iyer, 3 pages, Jan. 26, 2009.

USPTO, Office Action dated Apr. 20, 2009 for U.S. Appl. No. 10/715,815, filed Nov. 18, 2003 in the name of Jayaraman R. Iyer, 18 pages, Apr. 20, 2009.

USPTO, Office Action dated Dec. 3, 2009 for U.S. Appl. No. 10/715,815, filed Nov. 18, 2003 in the name of Jayaraman R. Iyer, 17 pages, Dec. 3, 2009.

USPTO, Office Action dated Mar. 29, 2010 for U.S. Appl. No. 10/715,815, filed Nov. 18, 2003 in the name of Jayaraman R. Iyer, 21 pages, Mar. 29, 2010.

USPTO, Final Office Action dated Jul. 8, 2010 for U.S. Appl. No. 10/715,815, filed Nov. 18, 2003 in the name of Jayaraman R. Iyer, 21 pages, Jul. 8, 2010.

State Intellectual Property Office of the People's Republic of China, The First Office Action and Text of the First Office Action, Application No. 200680027500.8, Chinese Office Action and English translation transmitted to Baker Botts L.L.P. on Oct. 21, 2010, 12 pages, Oct. 21, 2010.

USPTO, Office Action dated Oct. 28, 2010 for U.S. Appl. No. 10/715,815, filed Nov. 18, 2003 in the name of Jayaraman R. Iyer, 21 pages, Oct. 28, 2010.

USPTO, Office Action dated Feb. 16, 2011 for U.S. Appl. No. 10/715,815, filed Nov. 18, 2003 in the name of Jayaraman R. Iyer, 26 pages, Feb. 16, 2011.

Information Sciences Institute, "*Internet Protocol, DARPA Internet Program Protocol Specification*," Univ. of Southern California, 49 pages, Sep. 1981.

S. Deering, "*Host Extensions for IP Multicasting*," Stanford University, RFC 1112, 17 pages, Aug. 1989.

Pending U.S. Appl. No. 10/715,815 entitled, "*System and Method for Offering Quality of Service in a Network Environment*", 36 pages specification, claims and abstract, 2 pages of drawings, inventor Jayaraman R. Iyer, Nov. 18, 2003.

* cited by examiner

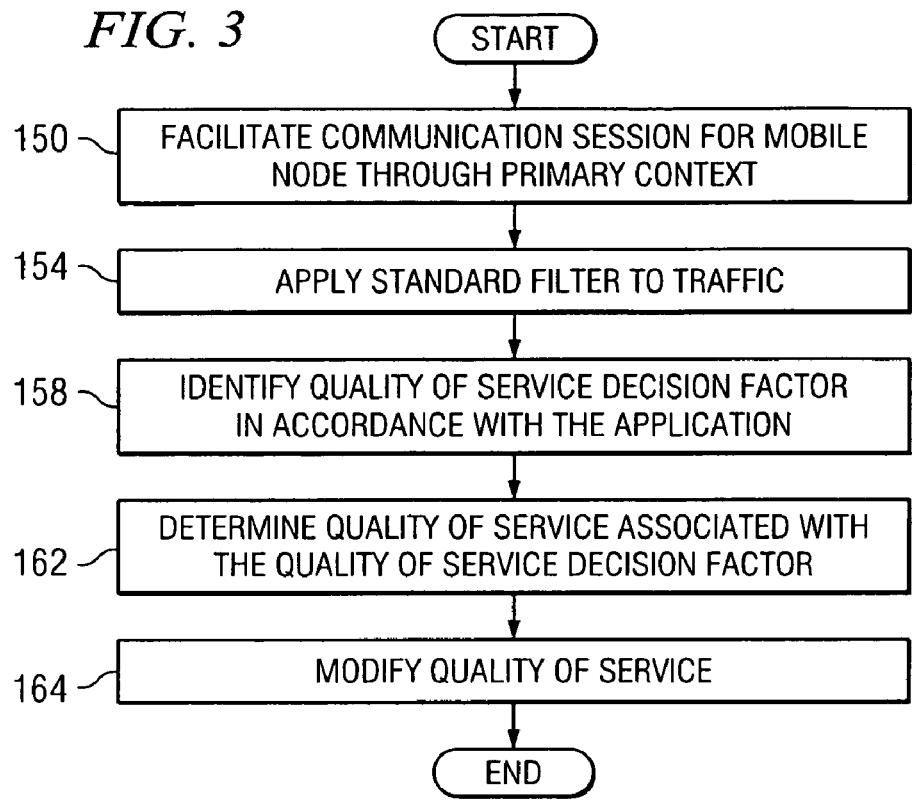
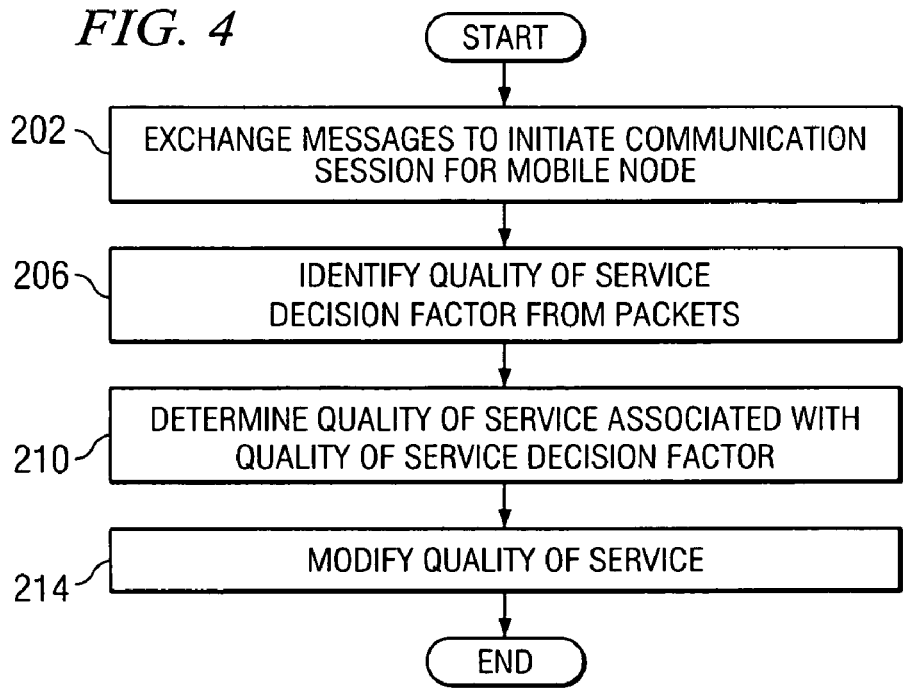

DYNAMICALLY PROVIDING A QUALITY OF SERVICE FOR A MOBILE NODE

TECHNICAL FIELD

This invention relates generally to the field of telecommunications and more specifically to dynamically providing a quality of service for a mobile node.

BACKGROUND

Communication networks may provide a specific quality of service (QoS) for an endpoint during a communication session. The quality of service measures the quality of the service provided to the endpoint.

Known techniques for providing a quality of service include assigning a specific quality of service to an endpoint. According to these techniques, the assigned quality of service may be provisioned at the endpoint or at a home location register. The assignment, however, is static, and does not change in response to the conditions of the communication session. Other known techniques for providing a quality of service involve using external policy decision functions to determine the quality of service. The policy decision functions, however, typically require extensive enhancement of the endpoints. Accordingly, providing a quality of service may pose difficulties in certain situations.

SUMMARY OF THE DISCLOSURE

In accordance with the present invention, disadvantages and problems associated with previous techniques for providing a quality of service may be reduced or eliminated.

According to one embodiment of the present invention, providing a quality of service for a mobile node includes facilitating a communication session for the mobile node. A quality of service decision factor of a context of the communication session is established. A quality of service associated with the quality of service decision factor is identified. Whether to provide the quality of service to the mobile node for the context is determined.

Certain embodiments of the invention may provide one or more technical advantages. A technical advantage of one embodiment may be that a node of the system may recognize a quality of service (QoS) decision factor of a context. Example QoS decision factors include content communicated during a context, a software application requested for a context, or a service requested for a context. The node may then identify a quality of service associated with the factor, and then provide the identified quality of service.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart illustrating one embodiment of providing a quality of service for a primary context; and FIG. 4 is a flowchart illustrating one embodiment of a method for providing a quality of service.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
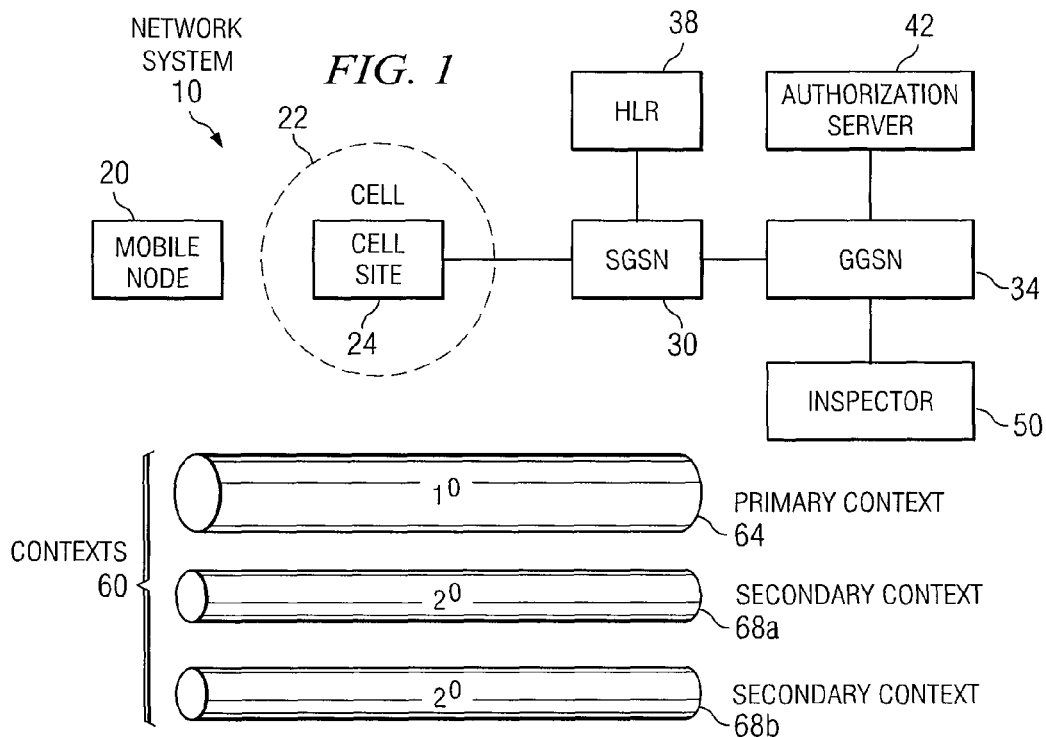
FIG. 1 is a block diagram of one embodiment of a system for providing a quality of service for an endpoint.

FIG. 1 is a block diagram of one embodiment of a system for providing a quality of service for an endpoint. According to the embodiment, a node of the system may recognize a quality of service (QoS) decision factor of a context. Example QoS decision factors include content communicated during a context, a software application requested for a context, or a service requested for a context. The node may then identify a quality of service associated with the factor. The system may then provide the identified quality of service.

According to the illustrated embodiment, network system 10 operates to provide services such as communication sessions to endpoints such as mobile node 20. A communication session may refer to an active communication between endpoints, measured from endpoint to endpoint. Information is communicated during a communication session. Information may refer to voice, data, text, audio, video, multimedia, control, signaling, other information, or any combination of the preceding. System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

According to one embodiment, system 10 operates according to the general packet radio service (GPRS) protocols specified by the ETSI Global System for Mobile Communications (GSM) standards. GPRS represents a packet-based data bearer service for communication services that may be delivered as a network overlay for any suitable network configuration. GPRS generally applies packet-radio and packet switching principles to transfer data packets between GSM elements and external packet data networks. GPRS may support multiple Internet communication protocols and may enable existing IP, X.25, frame relay, or any other suitable applications to operate over GSM contexts.

System 10 may include all or a portion of one or more communication networks. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

According to one embodiment, system 10 allows mobile node 20 to create a number of contexts 60, where each context 60 may have a different quality of service for the packets of the context 60. System 10 may provide a quality of service for a context 60 by recognizing a QoS decision factor of the context 60, identifying a quality of service associated with the factor, and providing the identified quality of the service.

According to the illustrated embodiment, system 10 includes a mobile node 20, a cell 22, a serving GPRS support node (SGSN) 30, a gateway GPRS support node (GGSN) 34, a home location register (HLR) 38, authorization server 42, and an inspector 50, coupled as shown.

Mobile node 20 represents any suitable device operable to communicate with a communication system. In general, a device may include any suitable arrangement of components operable to perform the operations of the device, and may comprise logic such as hardware, software, other logic, or any suitable combination of the preceding. Mobile node 20 may comprise, for example, a personal digital assistant, a computer such as a laptop, a cellular telephone, a mobile handset, or any other device operable to communicate with system 10. Mobile node 20 may be uniquely identified by an endpoint identifier. An endpoint identifier may comprise, for example, a mobile station (MS) Integrated Services Digital Network (ISDN) identifier, an International Mobile Subscriber Identity (IMSI), a username, a domain, an access point node, other identifier, or any suitable combination of the preceding.

Cell 22 represents a geographic unit of a network attachment point of a communication network. As an example, cell 22 may represent a cell of a cellular network or a hot spot of a wireless network. A cell 22 may have a cell identifier that uniquely identifies the cell 22, and may comprise any suitable identifier. A cell identifier of a cell 22 may comprise an address, for example, a medium access control (MAC) address or an IPvx such as IPv4 or IPv6 address, for an access point of the cell 22.

Cell site 24 represents an access point that provides wireless services to mobile node 20 present in, or visiting, cell 22. A mobile node 20 may be present in, or visiting, cell 22 if mobile node 20 is within the range of cell site 24 of cell 22. An access point may refer to a network point that couples a wireless network, such as a wireless radio network, to a wired network, such as a wired area network.

Cell site 24 may facilitate a handover procedure by redirecting packets, such as traffic or control packets, in response to movement of mobile node 20. A handover procedure may refer to the process by which a communication session for mobile node 20 is passed from a previous cell site 24 to a current cell site 24 as mobile node 20 moves from a previous cell 22 to a current cell 22. A previous cell 22 refers to the cell 22 in which mobile node 20 is present prior to a handoff, and a current cell 22 refers to the cell 22 in which mobile node 20 is present after the handoff.

A cell site 24 may comprise any suitable logic operable to provide wireless services to mobile nodes 20 present in cell 22. According to one embodiment, cell site 24 includes a base transceiver station and a base station controller. The base transceiver station communicates signals to and from mobile node 20 through a wireless link that is typically a radio frequency link. A base transceiver station may comprise, for example, a 3 G Node B. The base station controller manages the operation of the base transceiver station. Cell site 24 may include other or additional logic. For example, cell site 24 may include a radio network layer (RNL) operable to process packets for each endpoint.

SGSN 30 and GGSN 34 represent network devices that cooperate in order to facilitate a communication session for mobile node 20. GGSN 34 represents a network device that may work in conjunction with multiple SGSNs 30 to provide a communications medium in a GPRS service network environment.

According to one embodiment, GGSN 34 is operable to recognize a QoS decision factor of a context 60 and identify a quality of service associated with the factor. The quality of service measures the quality of the service provided to the endpoint, and may refer to a quality of service (QoS), a grade of service, a class of service, or other measure of the quality of a service. A QoS decision factor may refer to a feature of a context upon which dynamic quality of service decisions may be made. Example QoS decision factors include content communicated during a context 60, a software application requested for a context 60, a service requested for a context 60, or any suitable combination of the preceding.

According to one embodiment, a QoS decision factor may refer to content communicated during a context 60. For example, content may include voice, data, text, audio, video, multimedia, other information, or any combination of the preceding. The selection of the quality of service may be based upon the type of content transmitted in the context 60.

According to another embodiment, a QoS decision factor may refer to a software application requested for a context 60. Example software applications may include electronic mail, voice, video, web access, other software application, or any combination of the preceding. A quality of service may be selected based upon the application requested for the context 60.

According to yet another embodiment, a QoS decision factor may refer to a service requested for a context 60. A service may refer to a service provided by a service provider to a subscriber. Example services include Internet access, wireless access, or telephone services. The quality of service may be selected based upon the type of service accessed by mobile node 20.

In other embodiments, any other suitable network device, for example, a router, may perform the operations as described with reference to GGSN 34. To identify a network device that provides such functionality, the interface of the router may be monitored to detect whether quality of service is dynamically updated and applied. The operations of GGSN 34 are described in more detail below.

Home location register (HLR) 38 represents a network device that maintains subscription information for mobile nodes 20. The subscription information describes the services to which mobile nodes subscribe, and may also be used to authenticate mobile node 20.

Authorization server 42 may represent any suitable device operable to provide authorization-related services. Authorization-related services may include services for authentication, authorization, accounting, or any suitable combination of the preceding. Authentication may refer to validating the identity of mobile node 20. Authorization may refer to giving mobile node 20 permission to do or to access something. Accounting may refer to tracking the usage of resources. As an example, authorization server 42 may provide one, two, or three of the listed services.

Inspector 50 may represent a network device that inspects packets to identify applications initiated by mobile node 20. According to one embodiment, inspector 50 may be a part of GGSN 34. Inspector 50 may comprise a wireless application protocol (WAP) gateway, a compression or optimization engine, a billing engine, a service enforcement element, a content authorization or inspection engine, a policy enforcement gateway, or any other element that is operable to inspect, view, modify, process, or transform data or information in a network environment. Inspector 50 provides communication session information to GGSN 34.

GGSN 34 or inspector 50 may identify a QoS decision factor from signaling messages. The QoS decision factor may be identified from the messages in any suitable manner. As a first example, a voice over Internet Protocol (VoIP) service may be identified from Session Initiation Protocol (SIP) signaling messages. As a second example, a streaming media service may be identified from Real Time Streaming Protocol (RTSP) messages. As a third example, an electronic mail application may be derived from messages for downloading an electronic mail message. After identifying the QoS decision factor, the factor, such as content, may be mapped to the correct QoS profile.

Contexts 60 includes one or more contexts, such as one or more GPRS Tunneling Protocol (GTP) contexts. According to the illustrated embodiment, contexts 60 include a primary ($1^\circ$) context 64 and one or more secondary ($2^\circ$) contexts 68, such as 68a and 68b. A context 60 may carry traffic for a specified application. For example, mobile node 20 may simultaneously run a web browser application and a voice-over IP application over multiple contexts 60.

According to one embodiment of operation, mobile node 20 initiates creation of one or more contexts 60. GGSN 34 is operable to recognize a QoS decision factor of a context 60 and identify a quality of service associated with the factor. GGSN 34 may recognize the QoS decision factor in any suitable manner. According to one embodiment, GGSN 34 may receive a request to initiate creation of a secondary context 68. Secondary context 68 may include a filter that maps QoS decision factors to ports. An example filter may map Layer 7 applications to Layer 3 ports. A filter may include a source IP address, a source port, a destination IP address, a destination port, and a QoS decision factor. The QoS decision factor may be expressed as a Differentiated Services Code Point (DSCP) value of the Differentiated Services (DiffServ) model. GGSN 34 establishes the ports from the request, and identifies the QoS decision factor associated with the ports using the filter. An example of this embodiment is described in more detail with reference to FIG. 2.

According to another embodiment, GGSN 34 may store standard filters. GGSN 34 applies the standard filters to traffic communicated between mobile node 20 and GGSN 34. An example of this embodiment is described in more detail with reference to FIG. 3. According to yet another embodiment, GGSN 34 may identify the ports from session initiation signaling. GGSN 34 then identifies QoS decision factors from media signaling and maps the QoS decision factors to the ports. Afterwards, GGSN 34 may then identify the QoS decision factors from the port. An example of this embodiment is described in more detail with reference to FIG. 4.

GGSN 34 may identify a quality of service associated with the QoS decision factor in any suitable manner. According to one embodiment, GGSN 34 may use mappings between QoS decision factors and quality of service profiles to determine the quality of service associated with a QoS decision factor. A quality of service profile may include performance parameters, such as error conditions, required for a particular quality of service.

The mappings may be stored in any suitable manner, such as in a table, which may be supplied and updated by authorization server 42. Example mappings are described with reference to TABLE 1.

TABLE 1

|  | $A_1$ | $A_2$ | $A_j$ | $A_n$ | Max QoS |
|---|---|---|---|---|---|
| $User_1$ | $QoS_{11}$ | $QoS_{12}$ | $QoS_{1j}$ | $QoS_{1n}$ | $MaxQoS_1$ |
| $User_2$ | $QoS_{21}$ | $QoS_{22}$ | $QoS_{2j}$ | $QoS_{2n}$ | $MaxQoS_2$ |
| $User_i$ | $QoS_{i1}$ | $QoS_{i2}$ | $QoS_{ij}$ | $QoS_{in}$ | $MaxQoS_i$ |
| $User_m$ | $QoS_{m1}$ | $QoS_{m2}$ | $QoS_{mj}$ | $QoS_{mn}$ | $MaxQoS_m$ |

TABLE 1 includes rows for users $User_i$, $i=1, 2, \ldots, m$, columns for QoS decision factors $A_j$, $j=1, 2, \ldots, n$, and a column for a maximum quality of service $MaxQoS_i$ for each user $User_i$. A column for QoS decision factor $A_j$ provides the quality of service $QoS_{ij}$ for QoS decision factor $A_j$ for user $User_i$. The maximum quality of service (Max QoS) column provides the maximum quality of service $MaxQoS_i$ for user $User_i$. Each QoS decision factor may have a different quality of service. For example, a voice-over IP application may have a higher quality of service than that of a web browser application since the voice-over IP application has less tolerance for latency and delay.

The maximum quality of service may refer to the maximum quality of service allowed for a user. As an example, if primary and secondary contexts 60 are being used, the sum of the qualities of service for the contexts 60 must be less than or equal to the maximum quality of service. If only a primary context 60 is being used, the quality of service for the primary context 60 must be less than or equal to the maximum quality of service. If a request from mobile node 20 would cause mobile node 20 to exceed its maximum quality of service, GGSN 34 may deny the quality of service request.

System 10 may allow for the control the quality of service offered to various applications and users based on an individual capability. Moreover, the control of the quality of service may be offered without requiring substantial modification of mobile nodes 20.

A component of system 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations. "Interface" may refer to logic of a device operable to receive input for the device, send output from the device, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 10 without departing from the scope of the invention. As an example, system 10 may refer to any suitable system that includes a node operable to recognize a quality of service (QoS) decision factor of a context and identify a quality of service associated with the factor. The system may then provide the identified quality of service.

The components of system 10 may be integrated or separated according to particular needs. Moreover, the operations of system 10 may be performed by more, fewer, or other modules. Additionally, operations of system 10 may be performed using any suitable logic comprising software, hardware, other logic, or any suitable combination of the preceding. As used in this document, "each" refers to each member of a set or each member of a subset of a set.

Figure 2:
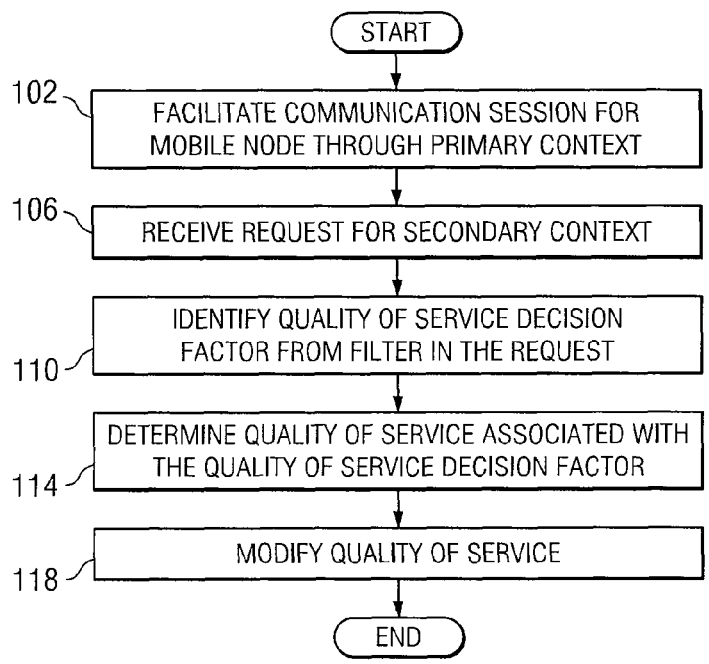
FIG. 2 is a flowchart illustrating one embodiment of a method for providing quality of service for primary and secondary contexts.

FIG. 2 is a flowchart illustrating one embodiment of a method for providing quality of service for primary and secondary contexts. The method begins at step 102, where GGSN 34 facilitates a communication session for mobile node 20 through a primary context 64 using a default quality of service. GGSN 34 receives a request for a secondary context 68 from mobile node 20 at step 106. The request may specify ports associated with a requested QoS decision factor, such as an application. The request may also include a filter that maps QoS decision factors to ports.

GGSN 34 identifies the requested QoS decision factor from the filter at step 110. GGSN 34 may apply the filter to the ports to identify the QoS decision factor. GGSN 34 may also determine whether mobile node 20 is authorized to access the QoS decision factor. GGSN 34 determines a quality of service associated with the QoS decision factor at step 114. The quality of service may be determined from a table that maps the QoS decision factor with the quality of service.

GGSN 34 may modify the quality of service by sending a quality of service response to mobile node 20 at step 118. If the quality of service associated with the application can be accommodated and satisfy the maximum quality of service for mobile node 20, GGSN 34 may allow the quality of service. Otherwise, GGSN 34 may reject the quality of service. If the quality of service request is rejected, GGSN 34 may use best efforts to provide the application. The quality of service response includes the quality of service granted to mobile node 20. After sending the quality of service response, the method terminates.

Modifications, additions, or omissions may be made to the method without departing from the scope of the invention. The method may include more, fewer, or other steps. Additionally, steps may be performed in any suitable order without departing from the scope of the invention.

FIG. 3 is a flowchart illustrating one embodiment of providing a quality of service for a primary context. The method at step 150, where GGSN 34 facilitates a communication session for mobile node 20 through a primary context 64 using a default quality of service. During the communication session traffic is communicated between mobile node 20 and GGSN 34.

GGSN applies standard filters to the traffic at step 154. A standard filter may refer to a filter that has been provided to GGSN 34. GGSN 34 identifies a QoS decision factor in response to the application of the standard filters at step 158. The QoS decision factor may comprise, for example, the type of content transmitted in the traffic.

GGSN 34 determines the quality of service associated with the QoS decision factor at step 162. The determination may be made in a manner similar to that described with reference to step 114 of FIG. 2. GGSN 34 may modify the quality of service by sending a quality of service response to mobile node at step 164. The response may be similar to that described with reference to step 118 of FIG. 2. After sending the quality of service response, the method terminates.

Modifications, additions, or omissions may be made to the method without departing from the scope of the invention. The method may include more, fewer, or other steps. Additionally, steps may be performed in any suitable order without departing from the scope of the invention.

FIG. 4 is a flowchart illustrating one embodiment of a method for providing a quality of service. The method begins at step 202, where GGSN 34 exchanges messages with mobile node 20 using a default quality of service. The messages may be signaling messages exchanged over a non-quality of service bearer stream.

GGSN 34 or inspector 50 identifies a QoS decision factor from the messages at step 206. The QoS decision factor may be identified from a packet sent by mobile node 20, and may be identified in any suitable manner. As a first example, a voice over Internet Protocol (VoIP) service may be identified from Session Initiation Protocol (SIP) signaling messages. As a second example, a streaming media service may be identified from Real Time Streaming Protocol (RTSP) messages. As a third example, an electronic mail application may be derived from messages for downloading an electronic mail message.

GGSN 34 determines the quality of service associated with the QoS decision factor at step 210. The determination may be made in a manner similar to that described with reference to step 114 of FIG. 2. GGSN 34 may modify the quality of service by sending a quality of service response to mobile node at step 214. The response may be similar to that described with reference to step 118 of FIG. 2. After sending the quality of service response, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a node of the system may recognize a quality of service (QoS) decision factor of a context. Example QoS decision factors include content communicated during a context, a software application requested for a context, or a service requested for a context. The node may then identify a quality of service associated with the factor, and then provide the identified quality of service.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method of providing a quality of service for a mobile node, comprising:
   facilitating a communication session for the mobile node;
   receiving a request to initiate creation of a plurality of General Packet Radio Service (GPRS) Tunneling Protocol (GTP) contexts of the communication session;
   identifying a software application initiated for a first GTP context, a service initiated for a second GTP context, and content requested for a third GTP context by the mobile node;
   establishing a quality of service decision factor of each GTP context of the communication session, the quality of service decision factors comprising the software application, the service, and the content;
   identifying, by a network node distinct from the mobile node, the qualities of service associated with the quality of service decision factors from a table mapping the software application of the first GTP context to a first quality of service, the service of the second GTP context to a second quality of service, and the content of the third GTP context to a third quality of service;

determining, by the network node, whether the sum of the qualities of service of the GTP contexts of the communication session exceeds a maximum quality of service for the mobile node; and providing, by the network node, the qualities of service to the mobile node for the GTP contexts if the sum does not exceed the maximum quality of service for the mobile node.

2. The method of claim 1, further comprising:
establishing a next quality of service decision factor of a next GTP context of the communication session;
identifying a next quality of service associated with the next quality of service decision factor; and
determining whether to provide the next quality of service to the mobile node for the next GTP context.

3. The method of claim 1, wherein:
facilitating the communication session for the mobile node further comprises:
exchanging one or more signaling messages for the communication session; and
establishing the quality of service decision factor of the GTP context of the communication session further comprises:
establishing the quality of service decision factor from the one or more signaling messages.

4. The method of claim 1, the establishing the quality of service decision factor of the GTP context of the communication session further comprising:
comparing at least one standard filter to one or more ports of the request, the at least standard filter associating the one or more ports to the software application; and
establishing the quality of service decision factor in accordance with the comparison.

5. A network node for providing a quality of service for a mobile node, comprising:
a memory operable to store data; and
a processor coupled to the memory and operable to:
facilitate a communication session for the mobile node;
receive a request to initiate creation of a plurality of General Packet Radio Service (GPRS) Tunneling Protocol (GTP) contexts of the communication session;
identify a software application initiated for a first GTP context, a service initiated for a second GTP context, and content requested for a third GTP context by the mobile node;
establish a quality of service decision factor of each GTP context of the communication session, the quality of service decision factors comprising the software application, the service, and the content;
identify the quality of service associated with the qualities of service decision factors from a table mapping the software application of the first GTP context to a first quality of service, the service of the second GTP context to a second quality of service, and the content of the third GTP context to a third quality of service;
determine whether the sum of the qualities of service of the GTP contexts of the communication session exceeds a maximum quality of service for the mobile node; and
provide the qualities of service to the mobile node for the GTP contexts if the sum does not exceed the maximum quality of service for the mobile node.

6. The network node of claim 5, the processor further operable to:
establish a next quality of service decision factor of a next GTP context of the communication session;
identify a next quality of service associated with the next quality of service decision factor; and
determine whether to provide the next quality of service to the mobile node for the next GTP context.

7. The network node of claim 5, the processor further operable to:
facilitate the communication session for the mobile node by:
exchanging one or more signaling messages for the communication session; and
establish the quality of service decision factor of the GTP context of the communication session by:
establishing the quality of service decision factor from the one or more signaling messages.

8. The network node of claim 5, the processor further operable to establish the quality of service decision factor of the GTP context of the communication session by:
comparing at least one standard filter to one or more ports of the request, the at least standard filter associating the one or more ports to the software application; and
establishing the quality of service decision factor in accordance with the comparison.

9. A system of providing a quality of service for a mobile node, comprising:
means for facilitating a communication session for the mobile node;
means for receiving a request to initiate creation of a plurality of General Packet Radio Service (GPRS) Tunneling Protocol (GTP) contexts of the communication session;
means for identifying a software application initiated for a first GTP context, a service initiated for a second GTP context, and content requested for a third GTP context by the mobile node;
means for establishing a quality of service decision factor of each GTP context of the communication session, the quality of service decision factors comprising the software application, the service, and the content;
means for identifying, by a network node distinct from the mobile node, the qualities of service associated with the quality of service decision factors from a table mapping the software application of the first GTP context to a first quality of service, the service of the second GTP context to a second quality of service, and the content of the third GTP context to a third quality of service;
means for determining, by the network node, whether the sum of the qualities of service of the GTP context and one or more other qualities of service of one or more other GTP contexts of the communication session exceeds a maximum quality of service for the mobile node; and
means for providing, by the network node, the qualities of service to the mobile node for the GTP contexts if the sum does not exceed the maximum quality of service for the mobile node.

10. A network system for providing a quality of service for a mobile node, comprising:
a network node operable to:
facilitate a communication session for the mobile node; and
receive a request to initiate creation of a plurality of General Packet Radio Service (GPRS) Tunneling Protocol (GTP) contexts of the communication session; and
an inspector in communication with the network node and operable to:

identify a software application initiated for a first GTP context, a service initiated for a second GTP context, and content requested for a third GTP context by the mobile node;

establish a quality of service decision factor of each GTP context of the communication session from one or more signaling messages, the quality of service decision factors comprising the software application, the service, and the content;

the network node further operable to:

identify the qualities of service associated with the quality of service decision factors from a table mapping the software application of the first GTP context to a first quality of service, the service of the second GTP context to a second quality of service, and the content of the third GTP context to a third quality of service;

determine whether the sum of the qualities of service of the GTP contexts of the communication session exceeds a maximum quality of service for the mobile node; and provide the qualities of service to the mobile node for the GTP contexts if the sum does not exceed the maximum quality of service for the mobile node.

11. The network system of claim 10, the network node further operable to:

establish a next quality of service decision factor of a next GTP context of the communication session;

identify a next quality of service associated with the next quality of service decision factor; and determine whether to provide the next quality of service to the mobile node for the next GTP context.

12. A network system for providing a quality of service for a mobile node, comprising:

a network node operable to:
facilitate a communication session for the mobile node; and an inspector in communication with the network node and operable to:

identify a software application initiated for a first General Packet Radio Service (GPRS) Tunneling Protocol (GTP) context, a service initiated for a second GTP context, and content requested for a third GTP context by the mobile node;

establish a quality of service decision factor for each GTP context of the communication session from one or more signaling messages, the quality of service decision factors comprising the software application, the service, and the content;

the network node further operable to:

identify the quality of service associated with the qualities of service decision factors from a table mapping the software application of the first GTP context to a first quality of service, the service of the second GTP context to a second quality of service, and the content of the third GTP context to a third quality of service; and determine whether to provide the quality of service to the mobile node for the GTP contexts;

the network node is further operable to:

facilitate the communication session for the mobile node by:

facilitating a primary context for the communication session; and receiving a request to create a secondary GTP context for the communication session, the request indicating one or more ports, the request comprising a filter, the filter associating the one or more ports to the quality of service decision factor; and establish the quality of service decision factor of the secondary GTP context of the communication session by:

comparing the filter to the one or more ports; and establishing a secondary quality of service decision factor in accordance with the comparison;

the network node is further operable to:

establish the secondary quality of service decision factor of the secondary GTP context of the communication session by:

comparing at least one standard filter to the one or more ports, the at least standard filter associating the one or more ports to the quality of service decision factor;

establishing the secondary quality of service decision factor in accordance with the comparison; and the network node is further operable to:

establish a next quality of service decision factor of a next GTP context of the communication session;

identify a next quality of service associated with the next quality of service decision factor;

determine whether the sum of the qualities of service of the GTP contexts of the communication session exceeds a maximum quality of service for the mobile node; and provide the qualities of service to the mobile node for the GTP contexts if the sum does not exceed the maximum quality of service for the mobile node.

* * * * *